United States Patent Office 3,450,537
Patented June 17, 1969

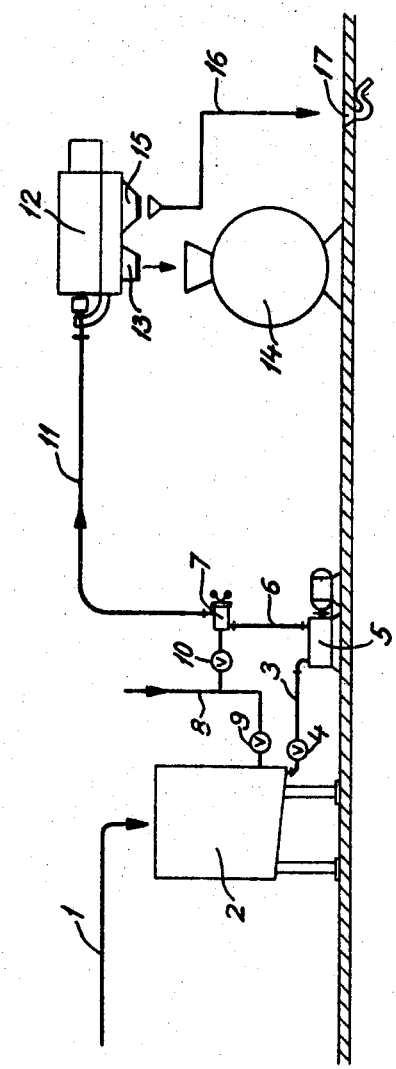

3,450,537
METHOD FOR PRODUCING BLOOD MEAL
Poul Filstrup, Tullinge, Sweden, assignor to Aktiebolaget Separator, Stockholm, Sweden, a corporation of Sweden
Filed Mar. 20, 1964, Ser. No. 353,542
Claims priority, application Sweden, Apr. 5, 1963, 3,761/63
Int. Cl. A23j 1/06; A23k 1/04; C05f 1/00
U.S. Cl. 99—21
3 Claims

ABSTRACT OF THE DISCLOSURE

Before steam-heating the raw blood to a coagulating temperature, it is preheated to a temperature lower than the coagulating temperature and held at this lower temperature. The coagulated blood from the steam-heating is dewatered mechanically and then dried.

---

This invention relates to the production of blood meal and more particularly to an improved method and apparatus for that purpose.

In order to utilize practically and economically the comparatively large blood quantities obtained during the slaughtering process in large slaughterhouses, the blood is generally used for the preparation of so-called blood meal, a granulated or pulverized product with a 5 to 10% water content. The blood meal is mainly used as a protein-enriching admixture to practically all kinds of cattle food. In case of a considerable overproduction, with the resulting low prices of the blood meal, the latter can even be used as agricultural fertilizer.

It will be apparent that if the production of blood meal is to be profitable in general, the production costs must be kept at the lowest possible level.

In producing blood meal, the main operation consists in the elimination of large quantities of water from the raw blood. Heretofore, this operation has been carried out by one of two methods. In the first, the raw blood is directly fed to a continuously or discontinuously operating drying device which is usually steam-heated and where the water content of the blood is reduced to a value between 5 and 10%. According to the other method, the raw blood is first coagulated by being heated in a batch-boiler, whereupon the liquid liberated from the coagulated blood mass is discharged from the bottom of the boiler over a period of several hours, possibly during the night. The blood mass thus drained, which still contains 70 to 80% water, is finally dried in a conventional dryer to a water content of 5 to 10%.

It is evident that the production of blood meal according to the above-mentioned prior methods is time-consuming and requires large quantities of energy, usually in the form of steam. Thus, the production costs are so high that they do not stand in any reasonable relation to the lower prices of the final product.

According to the present invention, the production costs for blood meal can be reduced so much in relation to the corresponding production costs involved by the previously used methods, as described above that there can be no doubt about the profitability, even in the case of lower product prices than those actually prevailing on the market. In method according to the invention, the raw blood is continuously led through a heating device in which the blood is heated to such a high temperature that it coagulates, the coagulated blood is dewatered in a continuously operating dewatering device, and the coagulated and dewatered blood is finally dried in a continuously operating drying device. The heating of the blood above its coagulation temperature can advantageously be achieved by direct injection of steam. Further, the raw blood, before being heated in the heating device, is preferably preheated to a temperature below the coagulation temperature, as this has proved to have a favorable effect upon the dewatering step subsequent to the heating and coagulation.

An apparatus made according to the invention comprises a combination of elements connected in series, namely, a raw blood container, a pump, a steam-heater, a dewatering device and a drier. The raw blood container is preferably provided with a preheating means.

The invention is described more in detail below, reference being made to the accompanying drawing in which the single illustration is a schematic view of a preferred apparatus for the production of blood meal according to the invention.

Raw blood from a slaughter line (not shown) is fed through a pipe 1 to a raw blood container 2. In the container 2, the raw blood can be directly or indirectly preheated by means of steam which is admitted through a steam pipe 8 and a control and shut-off valve 9. The blood is sucked from container 2 through a pipe 3 provided with a valve 4 and leading to a pump 5. The blood is delivered by pump 5 through a pipe 6 to a steam-heater 7 in which the blood is continuously heated to such a high temperature that it coagulates. The heating can be carried out indirectly but it is preferably achieved by direct injection of steam which is supplied to the heating zone 7 through the steam pipe 8 and a control and shut-off valve 10.

From the steam-heater 7, the blood is pumped through a pipe 11 to a dewatering device 12. The coagulation occurs mainly while the blood is conveyed through the pipe 11 and is completed before the blood is supplied to the dewatering device 12. The pipe 11 must therefore be dimensioned so that the time during which the blood is detained therein is sufficient for ensuring complete coagulation.

The dewatering device 12, which is preferably a continuously operating, horizontal sludge centrifuge (a so-called desludger), separates about ⅔ of the water quantity which is to be eliminated in order to obtain a final product with a water content of 5 to 10%.

The blood mass dewatered in the device 12 is discharged through an outlet 13 and fed to a conventional drying device 14 of the continuously operating type in which it is dried in the usual way to the previously mentioned final water content of 5 to 10%. The separated water is discharged from the dewatering device 12 through an outlet 15 and thence through a pipe 16 and a drain 17 to the sewer system of the slaughterhouse.

The supply of steam to the steam-heater 7 is automatically controlled by the valve 10 which is actuated by a thermostatic device (not shown) the sensing element of which can be placed in the pipe 11 immediately beyond the steam-heater 7. It has been found, however, that the heated, coagulated blood mass in the pipe 11 can produce incrustations on this temperature sensing element, so that its sensitivity and reliability are considerably reduced. According to the invention, this drawback is overcome in that the temperature sensing element of the thermostatic device is placed in the pipe 16 near the outlet 15, so that the separated water passes in contact with this element. The separated water is at a much lower temperature and has a considerably lower dry substance content than the blood mass in the pipe 11.

It will be apparent from the above that the present invention enables the production of blood meal at considerably lower costs than with the hitherto used methods and apparatus. In accordance with the present invention, the apparatus operates continuously, which means a considerable saving of time, and nearly ⅔ of the water quantity which is to be eliminated from the raw blood is separated mechanically by centrifugation so that considerable amounts of thermal energy for the drying are saved. Generally speaking, the latter factor alone makes it possible to process more than twice the blood quantity in an existing drying device or to attain the same production capacity as heretofore but with a drying device of less than half the conventional size.

I claim:
1. A method for producing blood meal which comprises the steps of pre-heating raw blood to a temperature lower than the coagulation temperature and holding it at said lower temperature, coagulating the pre-heated raw blood by continuously passing it through a heating zone while steam-heating the blood in said zone to a coagulating temperature, continuously de-watering the coagulated blood mechanically, and continuously drying the de-watered coagulated blood.

2. The method defined in claim 1, in which said de-watering step is effected by passing the coagulated blood through a horizontal de-sludging locus of centrifugal force and there centrifugally separating from the coagulated blood the main part of its water content.

3. The method defined in claim 1, in which the blood is heated in said heating zone by direct injection of steam into the blood.

References Cited

UNITED STATES PATENTS

| | | | |
|---|---|---|---|
| 2,165,721 | 7/1939 | Norman | 99—21 |
| 3,123,593 | 3/1964 | Allan et al. | 99—21 |

FOREIGN PATENTS

| | | |
|---|---|---|
| 22,101 | 10/1902 | Great Britain. |
| 25,077 | 11/1904 | Great Britain. |
| 456,882 | 11/1936 | Great Britain. |
| 463,464 | 3/1937 | Great Britain. |

A. LOUIS MONACELL, *Primary Examiner.*

HERMAN H. KLARE, *Assistant Examiner.*

U.S. Cl. X.R.

99—7, 199; 260—112